(12) United States Patent  
Yamane et al.

(10) Patent No.: US 11,669,662 B2
(45) Date of Patent: Jun. 6, 2023

(54) MACHINE LEARNING METHOD AND COMPUTING SYSTEM

(71) Applicant: FUJITSU LIMITED, Kawasaki (JP)

(72) Inventors: Shohei Yamane, Kawasaki (JP); Hiroaki Yamada, Kawasaki (JP); Takashi Yamazaki, Kawasaki (JP); Yoichi Kochibe, Chiba (JP); Toshiyasu Ohara, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/472,826

(22) Filed: Sep. 13, 2021

(65) Prior Publication Data

US 2022/0138381 A1    May 5, 2022

(30) Foreign Application Priority Data

Oct. 29, 2020    (JP) ............................. JP2020-181374

(51) Int. Cl.
*G06F 30/27*    (2020.01)
*G06F 30/392*    (2020.01)

(52) U.S. Cl.
CPC ............ *G06F 30/27* (2020.01); *G06F 30/392* (2020.01)

(58) Field of Classification Search
CPC .... G06F 30/27; G06F 30/392; G06F 2119/10; G06F 30/398; G06F 30/367; G06N 3/08; G06N 3/0454
See application file for complete search history.

(56) References Cited

U.S. PATENT DOCUMENTS

| 2001/0018761 | A1 | 8/2001 | Sasaki et al. |
| 2007/0249071 | A1 | 10/2007 | Lian et al. |
| 2015/0278422 | A1* | 10/2015 | Hiratsuka ............. G06F 30/398 716/126 |
| 2020/0110850 | A1 | 4/2020 | Yamane et al. |
| 2022/0027536 | A1* | 1/2022 | Dutta .................... G06N 20/00 |

FOREIGN PATENT DOCUMENTS

| EP | 3572957 A1 | 11/2019 |
| EP | 3671524 A1 | 6/2020 |
| JP | 2001-318961 A | 11/2001 |
| JP | 2005-251839 A | 9/2005 |

(Continued)

OTHER PUBLICATIONS

Extended European Search Report dated Mar. 7, 2022 for corresponding European Application No. 21194780.9, 13 pages.

(Continued)

*Primary Examiner* — Nha T Nguyen
(74) *Attorney, Agent, or Firm* — Fujitsu Patent Center

(57) ABSTRACT

An information processing apparatus calculates a value based on the lengths of wires included in inner layers selecting the inner layers other than outermost layers and layers adjacent to the outermost layers from among a plurality of layers included in circuit data. The information processing apparatus generates training data including first layer data corresponding to the patterns of the outermost layers, second layer data corresponding to the patterns of the layers adjacent to the outermost layers, and the value based on the lengths of the wires. The information processing apparatus trains a machine learning model by using the training data.

9 Claims, 12 Drawing Sheets

(56) References Cited

FOREIGN PATENT DOCUMENTS

| JP | 2009-534854 A | 9/2009 |
|---|---|---|
| JP | 6599067 B1 | 10/2019 |
| JP | 2020-060877 A | 4/2020 |
| WO | 2020/095362 A1 | 5/2020 |

OTHER PUBLICATIONS

Ilumoka, A. A., "Efficient and Accurate Crosstalk Prediction via Neural Net-Based Topological Decomposition of 3-D Interconnect", IEEE Transactions On Advanced Packaging, IEEE Service Center, Piscataway, NJ, USA, vol. 24, No. 3, Aug. 1, 2001, pp. 268-276, XP002617194.

Veluswami, Anand et al., "The Application of Neural Networks to EM-Based Simulation and Optimization of Interconnects in High-Speed VLSI Circuits", IEEE Transactions On Microwave Theory and Techniques, IEEE, USA, vol. 45, No. 5, May 1, 1997, XP011036829, pp. 712-723.

Henglin, Chen et al., "Modeling and Optimization of EMI Filter by Using Artificial Neural Network", IEEE Transactions On Electromagnetic Compatibility, IEEE Service Center, New York, NY, US, vol. 31, No. 6, Dec. 1, 2019, pp. 1979-1987, XP011764277.

\* cited by examiner

MACHINE LEARNING METHOD AND COMPUTING SYSTEM

CROSS-REFERENCE TO RELATED APPLICATION

This application is based upon and claims the benefit of priority of the prior Japanese Patent Application No. 2020-181374, filed on Oct. 29, 2020, the entire contents of which are incorporated herein by reference.

FIELD

The embodiments discussed herein relate to a machine learning technology.

BACKGROUND

When a current flows in an electronic circuit, electromagnetic waves are radiated from the electronic circuit. For products having electronic circuits, there may be a regulation that the intensity of radiated electromagnetic waves needs to be less than a threshold. Therefore, the electronic circuits are designed so as to meet the regulation of electromagnetic waves. For example, electromagnetic interference (EMI) is used as an index of the intensity of electromagnetic waves.

One method of estimating the intensity of electromagnetic waves during designing may be to carry out, using a computer, a physical simulation of analyzing the radiation state of electromagnetic waves. However, the physical simulation has problems that are high computational load and long execution time. A other method may be that a computer estimates the intensity of electromagnetic waves on the basis of circuit data by using a model created with machine learning. For example, the model is a neural network that is created through deep learning (DL). The estimation using such a model produces an estimation result with lows computational load and short execution time, as compared with the physical simulation.

By the way, there has been proposed a design support apparatus that assesses factors that cause variations in the electromagnetic susceptibility (EMC) of an electronic device into which a substrate under design is incorporated, by using substrate data representing the pattern formed on the substrate and a model created with machine learning.

For example, related arts are disclosed in Japanese Laid-open Patent Publication No. 2020-60877, and International Publication Pamphlet. No. WO2020/095362.

SUMMARY

According to one aspect, there is provided a non-transitory computer-readable storage medium storing a machine learning program executable by one or more computers. The machine learning program includes: an instruction for calculating a value based on a length of one or more wires included in one or more inner layers by selecting the one or more inner layers other than of layers and layers adjacent to the outermost layers from among a plurality of layers included in circuit data; an instruction for generating training data including first layer data corresponding to patterns of the outermost layers, second layer data corresponding to patterns of the layers adjacent to the outermost layers, and the value; and an instruction for training a machine learning model by using the training data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A model for estimating electromagnetic radiation is created with machine learning using training data. At this time, what is important is what type of data to use as an input to the model.

An electronic circuit may include N layers (N is an integer greater than four). For example, electronic circuit may a include the first layer including wires, the second layers as a power supply layer, the (N−1)th layer as a ground (GND) layer, and the Nth layer including wires. Inner layers between the second and (N−1)th layers may include wires. A one method, a computer may generate input data representing all wires of the N layers and use the input data as training data. However, there are an enormous number of candidates for a combination of wires of the N layers. If the training data is prepared so as to cover various combinations, the size of the training data becomes very large.

Figure 1:
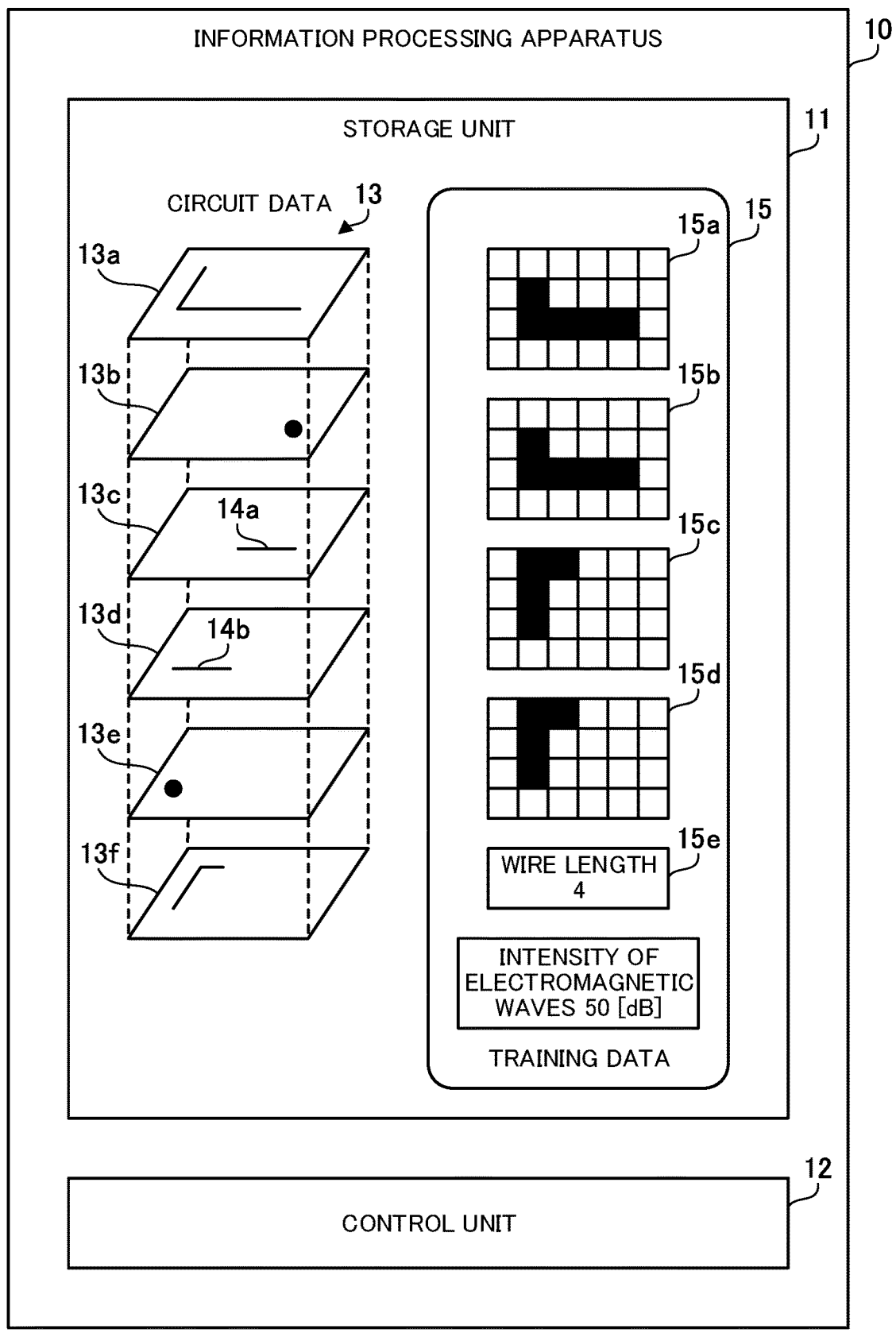
FIG. 1 is a view for explaining an information processing apparatus according to a first embodiment.

Hereinafter, some embodiments will be described with reference to the accompanying drawings. A first embodiment will be described first. FIG. 1 is a view for explaining an information processing apparatus according to the first embodiment. The information processing apparatus 10 of the first embodiment generates training data and performs machine learning (training of a machine learning model). The information processing apparatus 10 may be a client apparatus or a server apparatus. The information processing apparatus 10 may be called a computer or a machine learning apparatus.

The information processing apparatus 10 includes a storage unit 11 and a control unit 12. The storage unit 11 may be a volatile semiconductor memory, such as a random access memory (RAM). Alternatively, the storage unit 11 may be a non-volatile storage device, such as a hard disk drive (HDD) or a flash memory. The control unit 12 may be a processor such as a central processing unit (CPU), a graphics processing unit (GPU), or a digital signal processor (DSP). The control unit 12 may include an application specific integrated circuit (ASIC), a field programmable gate array (FPGA), or another electronic circuit. The processor executes a program stored in a memory (for example, the storage unit 11). A set of processors may be called a multiprocessor or simply "a processor."

The storage unit 11 stores therein circuit data 13 representing a physical design of an electronic circuit. The circuit data 13 includes the patterns of five or more individual layers. Each pattern represents the structure of a surface including wires, vias, conductive regions, non-conductive regions, and others. The set of layers may include a wiring layer, a ground (GND) layer, and a power supply layer. The wiring layer includes wires as conductors. The wires allow current to pass therethrough. The empty space of the wiring layer is covered with a non-conductor. The empty spaces of the GND layer and power supply layer are covered with conductors. The GND layer that has a large conductive region is called a solid GND layer.

The outermost layers out of the N layers (N is an integer greater than four), i.e., the first layer and the Nth layer are wiring layers. Layers adjacent to the outermost layers, i.e., the second layer and the (N−1)th layer are layers having large conductive regions. For example, the layers adjacent to the outermost layers are a GND layer and a power supply layer in which their empty spaces are covered with conductors. The second layer may be a power supply layer and the (N−1)th layer may be a GND layer.

As an example, the circuit data 13 represents a 6-layer electronic circuit. The circuit data 13 includes patterns 13a, 13b, 13c, 13d, 13e, and 13f corresponding to first to sixth layers. The pattern 13a represents a wiring layer that is one outermost layer with a wire. The pattern 13b represents a power supply layer which is adjacent to the outermost layer and whose empty space is covered with a conductor. The pattern 13c represents a wiring layer that is an inner layer with a wire 14a. The pattern 13d represents a wiring layer that is an inner layer with a wire 14b. In this connection, not all inner layers need to include wires. The pattern 13e represents a GND layer which is adjacent to the other outermost layer and whose empty space is covered with a conductor. The pattern 13f represents a wiring layer that is the other outermost layer with a wire.

The control unit 12 generates training data 15 on the basis of the circuit data 13. The control unit 12 performs machine learning for a model using the training data 15. The training data 15 includes feature data that corresponds to an input to the model and teaching data that corresponds to a correct output of the model. The feature data may be called an explanatory variable, whereas the teaching data may be called a target variable. The model created using the training data 15 is an electromagnetic wave estimation model for estimating electromagnetic waves radiated from an electronic circuit. The model may be a neural network. The machine learning may be deep learning. For example, an output of the model indicates the intensity of electromagnetic waves at a position apart from an electronic circuit by a predetermined distance. The correct intensity of electromagnetic waves may be measured using an electronic circuit implemented based on the circuit data 13. Alternatively, the correct intensity of electromagnetic waves may be calculated from a physical simulation.

To generate the training data 15, the control unit 12 selects inner layers other than outer layers including outermost layers and layers adjacent to the outermost layers, among a plurality of layers included in the circuit data 13. Among the N layers, the first, second, (N−1)th, and Nth layers are the outer layers, and the third to (N−2)th layers are the inner layers. The control unit 12 then calculates a value based on the length of a wire included in the inner layers. The value based on the length of a wire may be defined as the wire length itself of the wire or as a physical quantity that is dependent on the wire length of the inner layers. For example, the value based on the length of a wire may be defined as a current distribution(s) of one or more outer layers. The current distributions may logically be calculated on the basis of the wires of the outer and inner layers.

In the case where two or more inner layers have wires, the wire length may be the total length of the wires included in the two or more inner layers. As an example, the control unit 12 specifies the patterns 13c and 13d of the inner layers from the circuit data 13. The control unit 12 then calculates the sum of the length of the wire 14a included in the pattern 13c and the length of the wire 14b included in the pattern 13d.

The training data 15 includes layer data 15a, 15b, 15c, and 15d and wire length data 15e as input data. The layer data 15a corresponds to the pattern 13a of one outermost layer. The layer data 15b corresponds to the pattern 13b of the layer adjacent to the outermost layer. The layer data 15c corresponds to the pattern 13e of the layer adjacent to the other outermost layer. The layer data 15d corresponds to the pattern 13f of the other outermost layer. The wire length data 15e indicates a value based on the lengths of wires, as described above.

Each piece of the layer data 15a, 15b, 15c, and 15d represents a two-dimensional bitmap image representing the position and shape of a wire, for example. In the two-dimensional bitmap images, the elements at the positions through which a wire passes are set to "1," and the other elements are set to "0." Each piece of the layer data 15a, 15b, 15c, and 15d is image data with a size of 100 (vertical)× 100 (horizontal).

In this connection, the control unit 12 may edit the images corresponding to the patterns of the outer layers so as to improve the accuracy of the model. For example, the control unit 12 may change the elements at the positions through which the wire passes to a numerical value indicating the length of the wire. Thus processed image reflects a physical feature that a longer wire exhibits higher intensity of electromagnetic waves nearby. Alternatively, the control unit 12 may change the elements in the vicinity of the wire to numerical values in such a manner that a smaller numerical value is set for an element as the element is more separate from the wire. Thus processed image reflects the radiation state of electromagnetic waves in the vicinity of the wire.

In addition, the two-dimensional bitmap images corresponding to outer layers with large conductive regions, such as a power supply layer and a GND layer, may individually be generated to represent a path through which a current possibly flows. For example, the control unit 12 determines the path of a return current that flows in the power supply layer or GND layer when a current flows in its adjacent wiring layer, and generates a two-dimensional bitmap image corresponding to the power supply layer or GND layer so as to represent the return path. For example, the layer data 15b represents the path of a return current that flows in the power supply layer. The layer data 15c represents the path of a return current that flows in the GND layer.

There may be a case where a return path matches the route of a wire of an adjacent wiring layer. If this is the case, the layer data of an outermost layer and the layer data of its adjacent layer may be identical to each other. If so, the control unit 12 may omit the layer data of the layer adjacent to the outermost layer from the training data 15.

The input data included in the training data 15 may be a tensor including a predetermined number of channels. For example, the input data included in the training data 15 is a tensor with a size of 100 (vertical)×100 (horizontal)×5 (channels), including channels corresponding to the layer data 15a, 15b, 15c, and 15d and the wire length data 15e. The size of the tensor may be fixed, irrespective of the number of layers represented by the circuit data 13. Since the size of the wire length data 15e does not increase if the number of inner layers it increases, the control unit 12 is able to fix the size of the tensor.

The training data 15 does not include information indicating the shapes of the wires of the inner layers. This is because, in the case where the layers adjacent to the outermost layers include large conductive regions, the shielding effect is produced, so that the shapes of the wires of the inner layers do not have significant influence on the intensity of radiated electromagnetic waves. However, the wire length of the inner layers influences the amount of a current flowing in the outer layers and thus indirectly influence the intensity of radiated electromagnetic waves. Therefore, the training data 15 is designed to include information indicating the wire length of the inner layers in order to secure the accuracy of the model.

As described above, the information processing apparatus 10 generates the training data 15 and then creates, using machine learning, a model for estimating electromagnetic radiation on the basis of the features of a circuit structure. Thereby, the information processing system is able to estimate the electromagnetic radiation of an electronic circuit under design. At this time, the designer of the electronic circuit does not need to implement the electronic circuit under design or measure the intensity of electromagnetic waves. In addition, the information processing system does not need to carry out an electromagnetic wave simulation that has high computational complexity. Therefore, the designer is able to obtain information on electromagnetic radiation promptly.

In addition, although the training data 15 includes information representing the patterns of the outer layers, it does not include information representing the patterns of the inner layers. Therefore, the information processing apparatus 10 does not need to prepare many pieces of circuit data for the inner layers with wires of different shapes, which reduces the load of generating the training data 15. That is, the size of the training data 15 is reduced, and thus the computational complexity of the machine learning is reduced. In addition, the size of an input to the model may be fixed, irrespective of the number of inner layers. Therefore, the information processing system is able to use the same model for estimating the intensity of electromagnetic radiation from various electronic circuits with different numbers of layers.

Because of the shielding effect of the outer layers, the shapes of wires of the inner layers do not have significant influence on the intensity of electromagnetic waves at a distant position. However, the training data 15 includes information indicating the wire length of the inner layers. Therefore, the accuracy of the model created using the training data 15 is secured.

Figure 2:
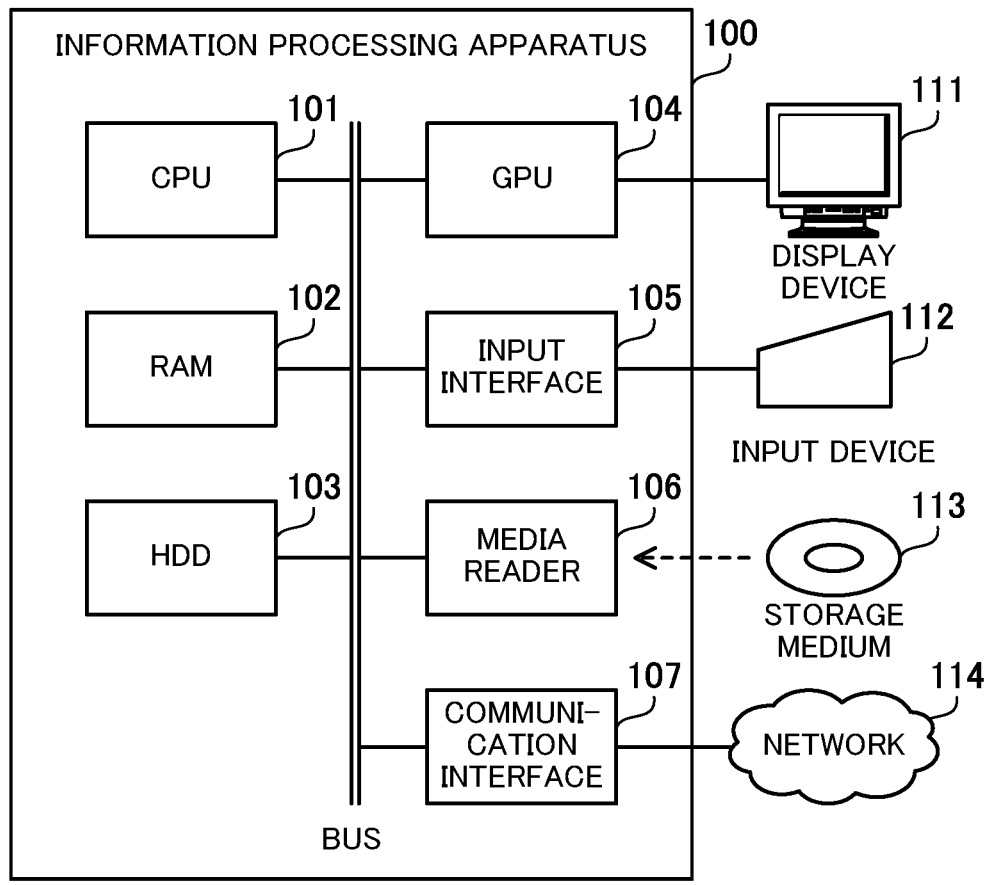
FIG. 2 illustrates an example of a hardware configuration of an information processing apparatus according to a second embodiment.

A second embodiment will now be described. FIG. 2 illustrates an example of a hardware configuration of an information processing apparatus according to the second embodiment. The information processing apparatus 100 includes a CPU 101, a RAM 102, an HDD 103, a GPU 104, an input interface 105, a media reader 106, and a communication interface 107. The information processing apparatus 100 corresponds to the information processing apparatus 10 of the first embodiment. The CPU 101 corresponds to the control unit 12 of the first embodiment. The RAM 102 or HDD 103 corresponds to the storage unit 11 of the first embodiment.

The CPU 101 is a processor that executes program instructions. The CPU 101 loads at least part of a program or data from the HDD 103 to the RAM 102 and executes the program. The information processing apparatus 100 may be provided with a plurality of processors. A set of processors may be called a multiprocessor, or simply "a processor."

The RAM 102 is a volatile semiconductor memory that temporarily stores therein a program executed by the CPU 101 and data used by the CPU 101 in processing. The information processing apparatus 100 may be provided with a different kind of memory than RAM or a plurality of memories.

The HDD 103 is a non-volatile storage device that stores therein software programs such as an operating system (OS), middleware, and application software, and data. The information processing apparatus 100 may be provided with a different kind of storage device such as a flash memory or a solid state drive (SSD) or a plurality of storage devices.

The GPU 104 outputs images to a display device 111 connected to the information processing apparatus 100 in accordance with commands from the CPU 101. The display device 111 may be a cathode ray tube (CRT) display, a liquid crystal display (LCD), an organic electro-luminescence (EL) display, or a projector, for example. Another kind of output device such s a printer may connected to the information processing apparatus 100.

The input interface 105 receives an input signal from an input device 112 connected information processing apparatus 100. The input device 112 may be a mouse, a touch panel, or a keyboard for example. A plurality of kinds of input devices may be connected to the information processing apparatus 100.

The media reader 106 is a reading device that reads a program or data from a storage medium 113. For example, the storage medium 113 is a magnetic disk, an optical disc, or a semiconductor memory. Magnetic disks include flexible disks (FDs) and HDDs. Optical discs include compact discs (CDs) and digital versatile discs (DVDs). The media reader 106 copies a program and data read from the storage medium 113 into another storage medium such as the RAM 102 or HDD 103. The read program may be executed by the CPU 101.

In this connection, the storage medium 113 may be a portable storage medium and may be used for distribution of programs and data. In addition, the storage medium 113 and HDD 103 may be called computer-readable storage media.

The communication interface 107 is connected to a network 114. The communication interface 107 communicates with another information processing apparatus over the network 114. The communication interface 107 may be a wired communication interface connected to a wired communication apparatus such as a switch or a router. Alternatively, the communication interface 107 may be a wireless communication interface connected to a wireless communication apparatus such as a base station or an access point.

The information processing apparatus 100 supports the design of electronic circuits. The information processing apparatus 100 may be a client apparatus or a server apparatus. The information processing apparatus 100 creates a model using machine learning. The model estimates, on the basis of the circuit data of an electronic circuit, the intensity of electromagnetic waves at a position apart from the electronic circuit by a predetermined distance (for example, 10 meters). For example, the distance is determined according to regulations of electromagnetic radiation set in individual country. The information processing apparatus 100 uses the model to estimate the intensity of electromagnetic waves radiated from an electronic circuit under design.

In the second embodiment, the information processing apparatus 100 itself generates training data, creates a model, and estimates the intensity of electromagnetic waves. In this connection, a plurality of information processing apparatuses may be used to generate training data, create a model, and estimate the intensity of electromagnetic waves in a distributed manner. The following describes a flow of estimating the intensity of electromagnetic waves by using machine learning.

Figure 3:
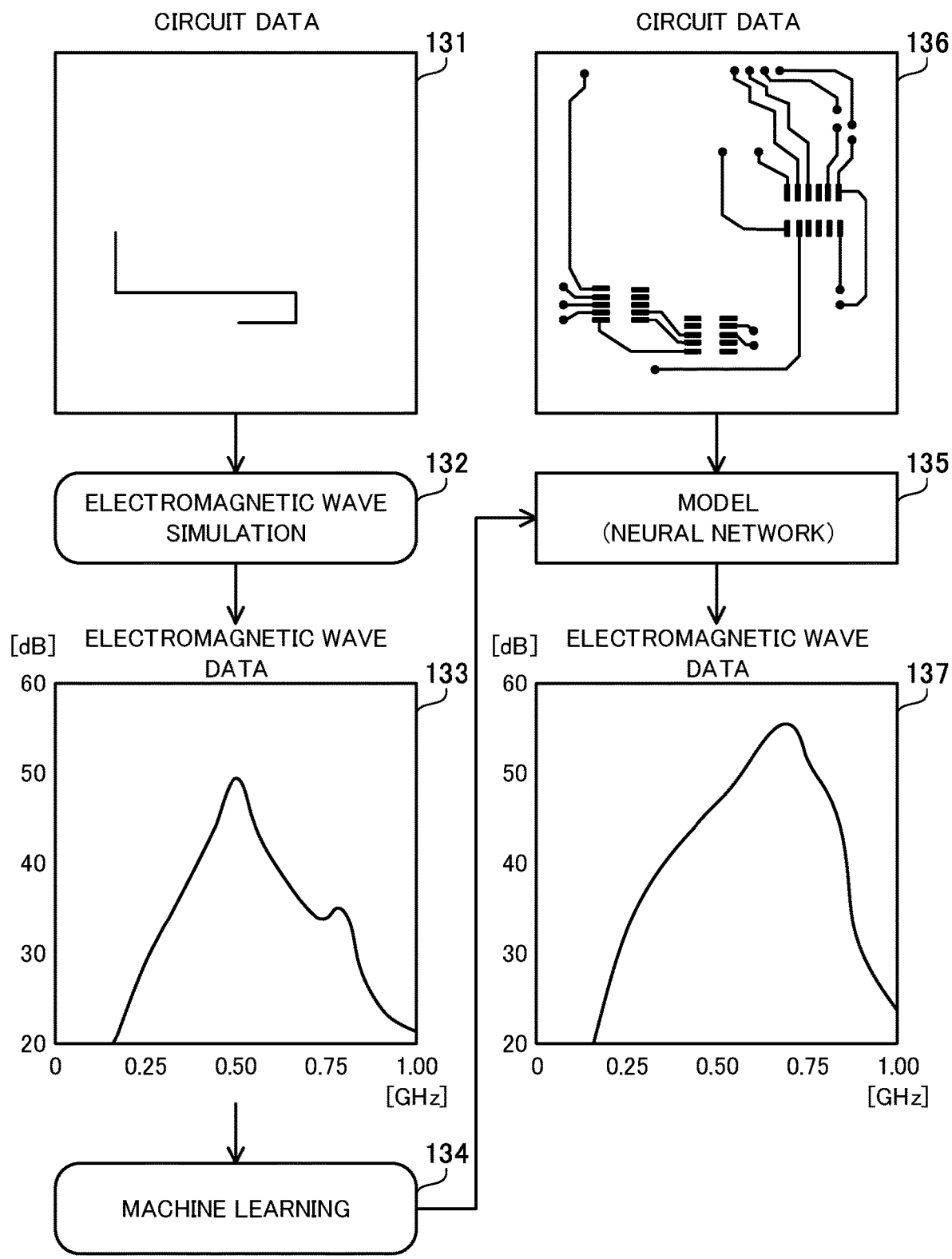
FIG. 3 illustrates an example of estimating the intensity of electromagnetic waves by using machine learning.

FIG. 3 illustrates an example of estimating the intensity of electromagnetic waves by using machine learning. The information processing apparatus 100 generates circuit data 131 for machine learning. The circuit data 131 includes a pattern representing the position and shape of a wire. The wire may relatively simply be represented in the circuit data 131. The information processing apparatus 100 carries out an electromagnetic wave simulation 132 on the circuit data 131 to generate electromagnetic wave data 133. The electromagnetic wave simulation 132 is a physical simulation that calculates the intensity of electromagnetic waves that are radiated from the electronic circuit represented by the circuit data 131 when a current follows in the electronic circuit. The electromagnetic wave simulation 132 may have high computational complexity and take long execution time.

The electromagnetic wave simulation 132 may be a three-dimensional finite element method simulation. For example, the information processing apparatus 100 divides the space in which the electronic circuit is placed into elements that are three-dimensional small areas, and assigns variables to the nodes of the elements. The information processing apparatus 100 generates a coefficient matrix indicating relationship between the variables, on the basis of a fundamental equation representing physical laws of electromagnetic waves. The information processing apparatus 100 repeats a matrix operation using the coefficient matrix to obtain the solution of the variables.

The electromagnetic wave data 133 indicate the intensity of electromagnetic waves at a position apart from the electronic circuit by a predetermined distance. The electromagnetic wave data 133 indicates the intensity of electromagnetic waves at different frequencies. For example, 100 frequencies at 0.01 GHz intervals are extracted in the range of 0 GHz to 1 GHz. For example, the electromagnetic wave data 133 is vector data listing 100 numerical values indicating the intensity of electromagnetic waves at the 100 frequencies.

The information processing apparatus 100 generates training data including input data based on the circuit data 131 and teaching data based on the electromagnetic wave data 133. The input data corresponds to an explanatory variable of the model, and the teaching data corresponds to a target variable of the model. The input data is feature data representing the features of wires of the electronic circuit. The information processing apparatus 100 generates a plurality of sets of circuit data 131 and electromagnetic wave data 133 while changing the wires of the electronic circuit. By doing so, the information processing apparatus 100 generates the training data including a sufficient number of records.

The information processing apparatus 100 performs machine learning 134 using the generated training data. The machine learning 134 is deep learning to create a model 135. The model 135 is a neural network and is, for example, a convolutional neural network including convolution operation. The machine learning 134 includes a back propagation method.

For example, the information processing apparatus 100 selects a record from the training data, inputs the input data included in the record into the model 135, and calculates an error between the output of the model 135 and the teaching data included in the record. For example, the error is the mean square error between two vectors each listing 100 numerical values indicating the intensity of electromagnetic waves. The information processing apparatus 100 updates parameters included in the model 135 so as to reduce the error. The parameters include the weights of edges of the neural network. The information processing apparatus 100 calculates an error gradient for the weight of each edge in order from the output layer to the input layer of the model 135, and updates the weights on the basis of the error gradients. By doing so, the model 135 is created.

The information processing apparatus 100 receives the circuit data 136 of an electronic circuit under design from a user. The circuit data 136 includes a pattern representing the positions and shapes of wires. The wires are represented in the circuit data 136 more precisely than the wire represented in the circuit data 131. The information processing apparatus 100 generates input data on the basis of the circuit data 136 and inputs the generated input data into the model 135 to generate electromagnetic wave data 137.

The input data based on the circuit data 136 is feature data representing the features of the wires of the electronic circuit under design, and the electromagnetic wave data 137 indicates an estimated value of the intensity of electromagnetic waves at a position apart from the electronic circuit under design by the predetermined distance, which are radiated from the electronic circuit under design. For example, the electromagnetic wave data 137 is vector data listing 100 numerical values indicating the intensity of electromagnetic waves at 100 frequencies between 0 GHz and 1 GHz.

Therefore, the designer of the electronic circuit does not need to implement the electronic circuit on the basis of the circuit data 136, in order only to measure the intensity of electromagnetic waves. In addition, the information processing apparatus 100 does not need to carry out the electromagnetic wave simulation 132 with high computational complexity on the circuit data 136. Therefore, the designer is able to obtain electromagnetic wave data for various design candidates promptly. The following describes how to process training data to reduce the size of an input to the model 135.

Figure 4:
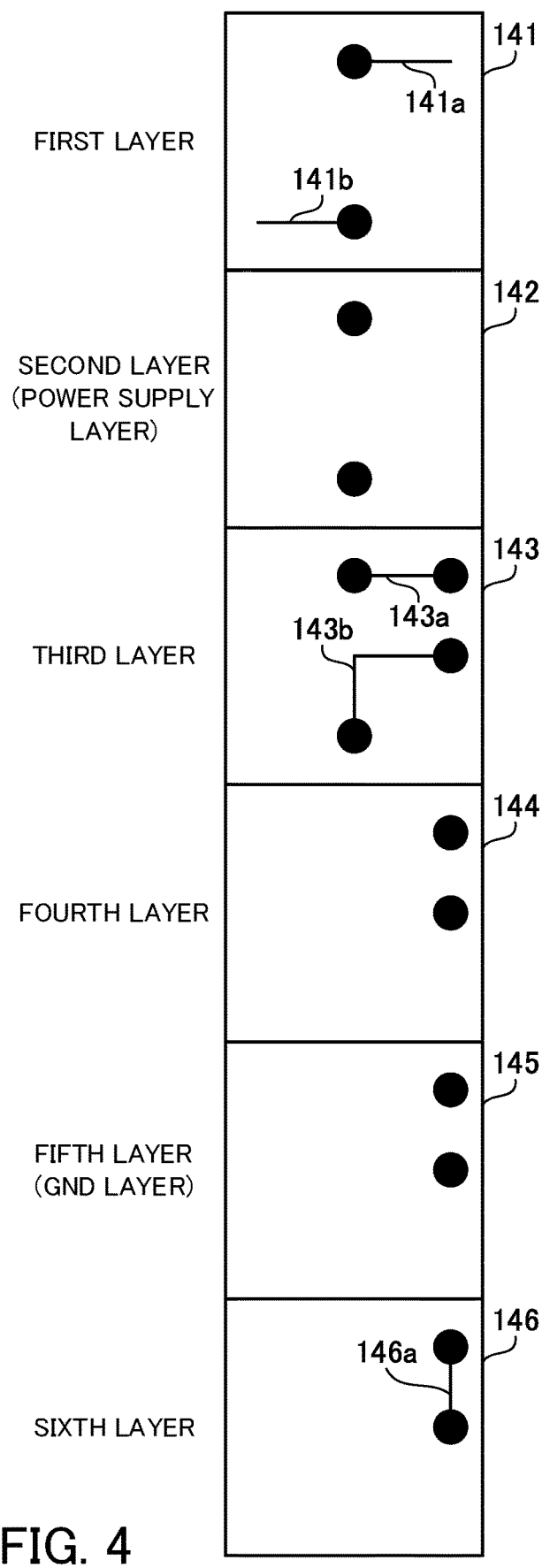
FIG. 4 illustrates an example of an electronic circuit with 6-layer structure.

FIG. 4 illustrates an example of an electronic circuit with 6-layer structure. The circuit data includes patterns 141 to 146 representing the wires of the first to sixth layers. In the electronic circuit, the first to sixth layers are laminated in a vertical direction. The first layer is at the top and the sixth layer is at the bottom. The first layer is a wiring layer, the second layer is a power supply layer, the third and fourth layers are wiring layers, the fifth layer is a GND layer, and the sixth layer is a wiring layer. The first, second, fifth, and sixth layers are outer layers. The third and fourth layers between the power supply layer and the GND layer are inner layers.

The pattern 141 representing the first layer includes wires 141a and 141b. The pattern 143 representing the third layer includes wires 143a and 143b. The pattern 146 representing the sixth layer includes a wire 146a. The wires 141a and 143a are connected by a vertical via. The wires 141b and 143b are connected by a vertical via. The pattern 142 representing the second layer includes holes through which these vias pass. The wires 143a and 146a are connected by a vertical via. The wires 143b and 146a are connected by a vertical via. The pattern 144 representing the fourth layer and the pattern 145 representing the fifth layer include holes through which these vias pass.

Here, the following method is considered, in which the information processing apparatus 100 generates image data representing wires per layer of an electronic circuit and uses the set of image data as an input to a model. In this method, however, a large size of data is input to the model. To improve the accuracy of the model into which a large size of data is input, the information processing apparatus 100 needs to increase the amount of training data. In addition, the information processing apparatus 100 is not able to use the same model for electronic circuits with different numbers of layers. Therefore, the information processing apparatus 100 needs to create a plurality of models respectively corresponding to the electronic circuits with different numbers of layers.

On the other hand, as will be described below, since electromagnetic waves are shielded by a power supply layer and a GND layer, the shapes of the wires of inner layers do not have significant influence on the intensity of electromagnetic waves at a distant position. Therefore, the information processing apparatus 100 defines an input to a model by simplifying information on the wires of the inner layers. In addition, the information processing apparatus 100 fixes the size of the input to the model, irrespective of the number of layers in an electronic circuit.

Figure 5:
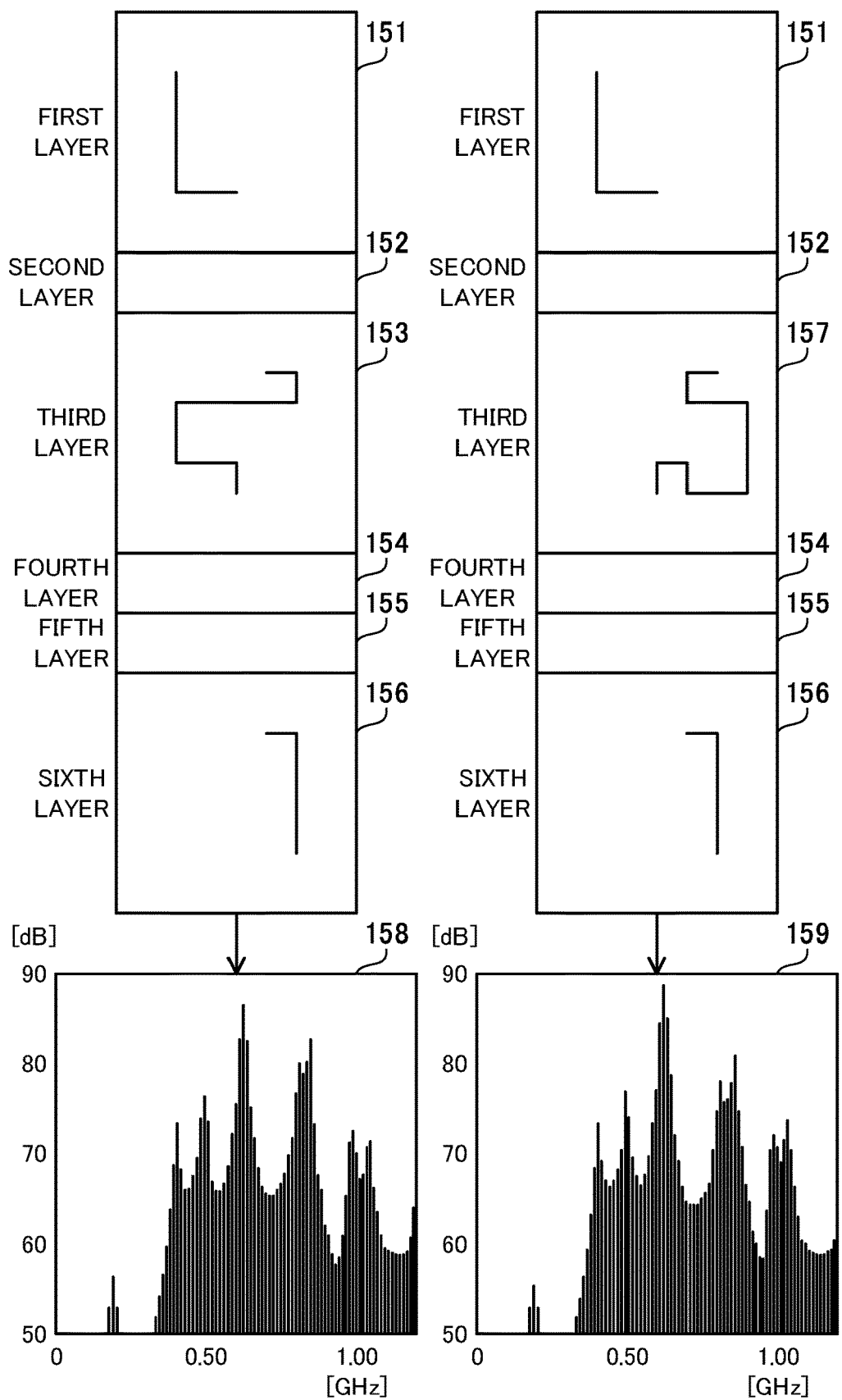
FIG. 5 illustrates examples of relationship between the shape of a wire of an inner layer and the intensity of electromagnetic waves.

FIG. 5 illustrates examples of relationship between the shape of a wire of an inner layer and the intensity of electromagnetic waves. First circuit data includes patterns 151 to 156 corresponding to the first to sixth layers. The second layer is a power supply layer and the fifth layer is a GND layer. The patterns 151, 153, and 156 include wires. A graph 158 indicates the intensity of electromagnetic waves that are radiated from the electronic circuit represented by the first circuit data.

On the other hand, second circuit data includes patterns 151, 152, 157, 154, 155, and 156 corresponding to the first to sixth layers. The third layer of the second circuit data has the pattern 157 that is different from the pattern 153. The other layers of the second circuit data have the same patterns as those of the first circuit data. The pattern 157 includes a wire of different shape from that included in the pattern 153, but the pattern 153 and pattern 157 have the same wire length. A graph 159 indicates the intensity of electromagnetic waves that are radiated from the electronic circuit represented by the second circuit data.

As seen in the graphs 158 and 159, these electronic circuits exhibit the approximate intensity of electromagnetic waves at a distant position even their inner layers have wires of different shapes. This is because the electromagnetic waves generated by the wires of the inner layers are shielded by the second and fifth layers. However, the current distributions of the outer layers are dependent on the wire length of the inner layers. That is, the wire length of the inner layers indirectly influences the intensity of electromagnetic waves at the distant position. Therefore, the information processing apparatus 100 adds, to the input data, information indicating the wire length as information on the inner layers.

Figure 6:
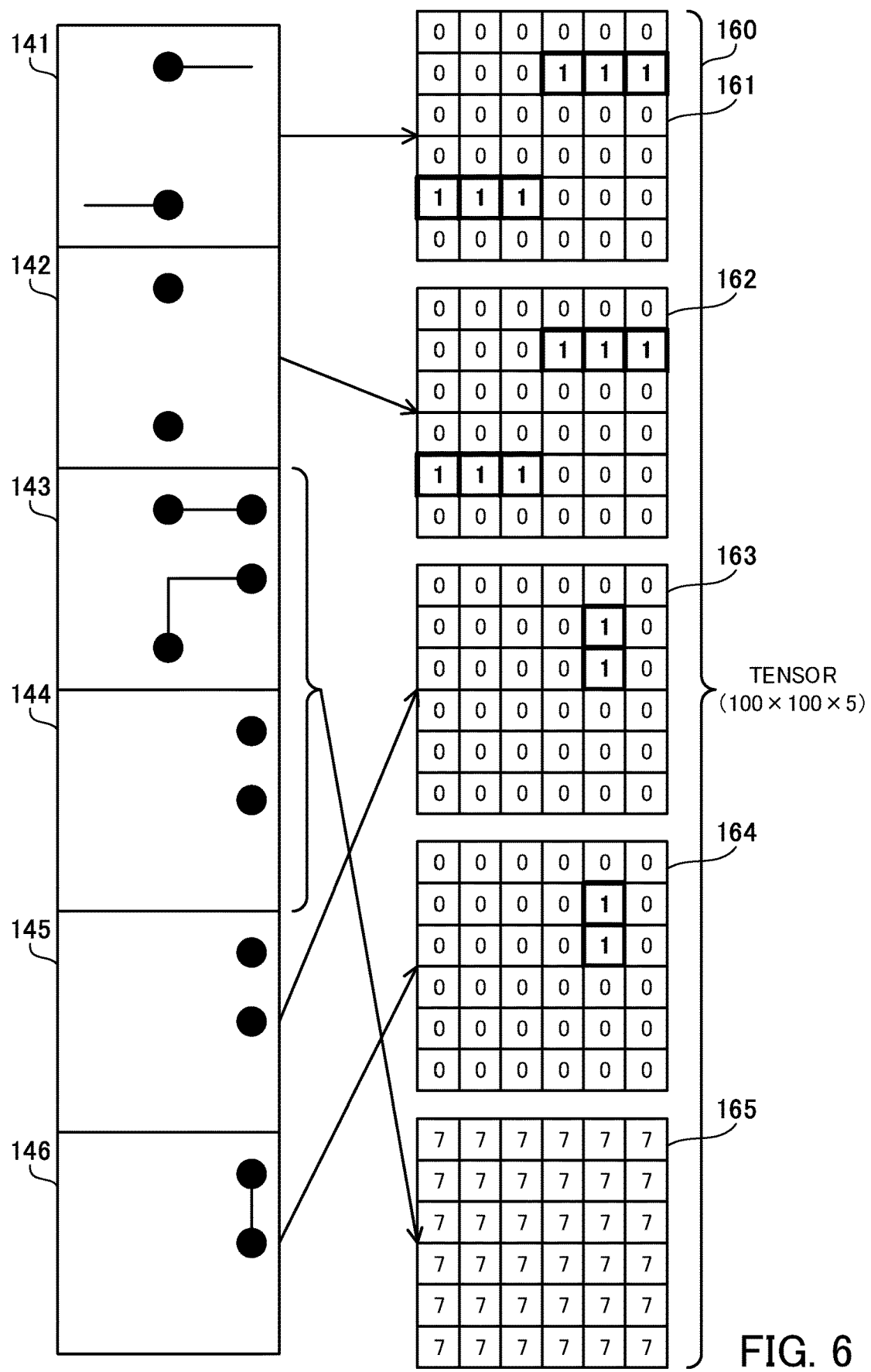
FIG. 6 illustrates an example of input data that is generated from 6-layer circuit data.

FIG. 6 illustrates an example of input data that is generated from 6-layer circuit data. The information processing apparatus 100 generates a tensor 160 as input data from the above-described patterns 141 to 146. The tensor 160 has a size of 100 (vertical)×100 (horizontal)×5 (channel). The tensor 160 includes image data 161 to 165 corresponding to five channels.

The image data 161 corresponds to the pattern 141 of the first layer. The image data 162 corresponds to the pattern 142 of the second layer. The image data 163 corresponds to the pattern 145 of the fifth layer. The image data 164 corresponds to the pattern 146 of the sixth layer. The image data 165 indicates the wire length of the third and fourth layers that are inner layers.

The image data 161 and 164 is two-dimensional bitmap images representing the wires of the wiring layers. The information processing apparatus 100 divides the pattern 141 into small areas in an orthogonal grid. The information processing apparatus 100 assigns "1" to small areas through which a wire passes, and "0" to the other small areas. Thereby, the image data 161 with elements each having a value of "0" or "1" is generated. The image data 161 indicates the positions of the wires of the first layer. In addition, the information processing apparatus 100 generates the image data 164 from the pattern 146. The image data 164 indicates the position of the wire of the sixth layer.

The image data 162 and 163 is two-dimensional bitmap images representing a return path in the power supply layer and GND layer, respectively. In each of the power supply layer and GND layer whose empty spaces are covered with conductors, a return current flows when a current flows through the wires of the adjacent wiring layer. In principle, the position and shape of the return path through which the return current flows are identical to those of the wires of the adjacent wiring layer. However, if a conductive obstacle such as a slit exists the return current flows detouring the obstacle.

The information processing apparatus 100 determines the return path on the patterns 142 and 145. The information processing apparatus 100 assigns "1" to small areas through which the return path passes and "0" to the other small areas. Thereby, the image data 162 and 163 with elements each having a value of 0 or 1 is generated. The image data 162 represents the return path in the second layer, and the image data 163 represents the return path in the fifth layer. In this connection, the image data 161 of the first layer and the image data 162 of the second layer are often identical to each other. In this case, the information processing apparatus 100 may omit the image data 162 from the tensor 160. Likewise, the image data 163 of the fifth layer and the image data 164 of the sixth layer are often identical to each other. In this case, the information processing apparatus 100 may omit the image data 163 from the tensor 160.

The image data 165 indicates the total wile length of the wires included in the third and fourth layers that are inner layers. To incorporate the information indicating the wire length in the tensor 160, the image data 165 has the same size as the image data 161 to 164. All elements included in the image data 165 have the same numerical value that indicates the total wire length of the inner layers. The index of the wire length may be defined as the actual total length of wires in the electronic circuit, in the unit of millimeters, centimeters, or the like. Alternatively, the index of the wire length may be defined as the number of elements through which the wires pass on the image data.

In this connection, some elements included in the image data 165 may have the same numerical value that indicates the total wire length of the inner layers and the other elements may be set to 0. In addition, the information process ng apparatus 100 may determine the structure of the neural network so as to input an additional scalar value in the neural network, other than the tensor including the image data 161 to 164. In this case, the information processing apparatus 100 does not need to match the format for the information indicating the wire length to the tensor.

In this connection, the information processing apparatus 100 may further edit the image data 161 to 164 with elements each having a value of 0 or 1. For example, the information processing apparatus 100 replaces the value indicating a wire or return path with a numerical value indicating the length of the wire or return path. Alternatively, the information processing apparatus 100 may convert the values of the elements around a wire or return path in such a manner that a smaller numerical value is set for an element as the element is more separate from the wire or return path. Thus processed image data reflects an approximate intensity of electromagnetic waves in the vicinity of the wire or return path.

In the manner described above, the tensor 160 that is input to the model includes four channels relating to the outer layers and one channel relating to the inner layers. The size of the tensor 160 is fixed, irrespective of the number of inner layers included in the electronic circuit, i.e., irrespective of the number of layers included in the electronic circuit.

Figure 7:
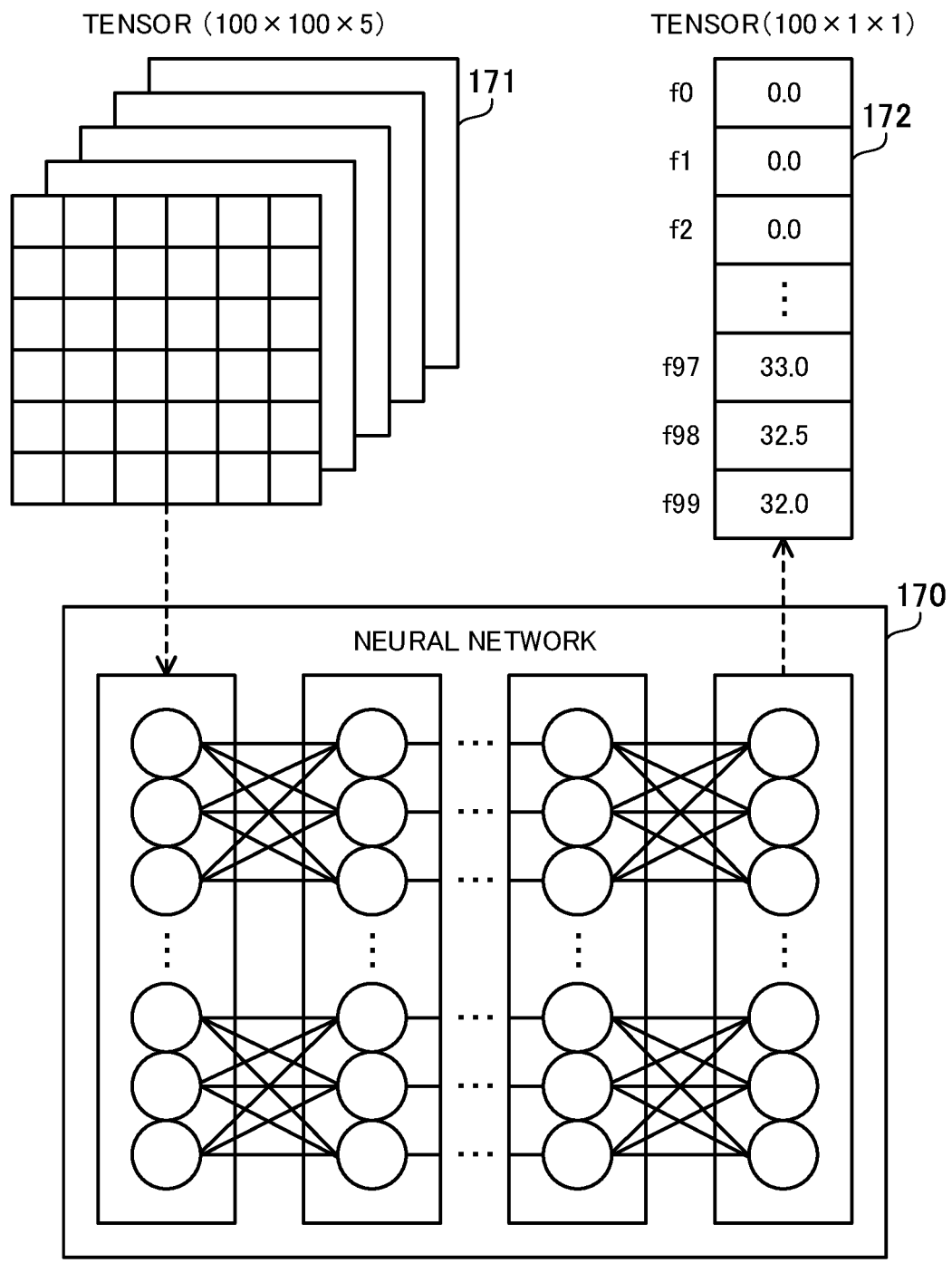
FIG. 7 illustrates an example of input data to and output data from a neural network.

FIG. 7 illustrates an example of input data to and output data from a neural network. A neural network 170 is an example of the above-described model 135. The neural network 170 is a multilayer neural network including an input layer, an output layer, and one or more intermediate layers. Each layer includes a plurality of nodes. The nodes of the input layer have edges connecting to nodes of an intermediate layer immediately after the input layer. The nodes of the output layer have edges connecting to nodes of an intermediate layer immediately before the output layer. The nodes of each intermediate layer have edges connecting to nodes of layers immediately before and after the intermediate layer. A parameter indicating a weight is assigned to each edge. The weights are determined through machine learning. In addition, the neural network 170 is a convolutional neural network in which convolution operation is implemented. The convolution operation is to repeat a product-sum operation while sliding a filter matrix called Kernel on an input tensor in order to generate a tensor called a feature map.

To the neural network 170, a tensor 171 corresponding to the above-described tensor 160 is input. The tensor 171 has a size of 100 (vertical)×100 (horizontal)×5 (channels). In addition, a tensor 172 corresponding to the above-described electromagnetic wave data 137 is output from the neural network 170. The tensor 172 has a size of 100 (vertical)×1 (horizontal)×1 (channel). That is, the tensor 172 is a column vector. The tensor 172 includes 100 numerical values indicating the intensity of electromagnetic waves at 100 frequencies.

The machine learning executes a back propagation method to determine the weights for the edges in the neural network 170. The back propagation method includes a forward phase, a backward phase, and an update phase. The forward phase is a phase in which the input data included in training data is input to the input layer and the computation of calculating an output value by repeatedly multiplying an input value by a weight in a forward direction from the input layer toward the output layer is performed to generate output data. The backward phase is a phase in which an error between the output data and the teaching data included in the training data is calculated and the error information is propagated in a reverse direction from the output layer toward the input layer to calculate an error gradient for the weight of each edge. The update phase is a phase in which the weights are updated based on the error gradients and a predetermined learning ratio. The above-described forward phase, backward phase, and update phase are repeatedly executed.

In the above explanation, th information processing apparatus 100 inputs, to the model, a numerical value indicating the total wire length of the inner layers as information indicating the wire length of the inner layers. Alternatively, the information processing apparatus 100 may input, to the model, a physical quantity that is dependent on the wire length of the inner layers. The information processing apparatus 100 is able to create the model that estimates the intensity of electromagnetic waves at a distant position on the basis of a physical quantity that is dependent on the wire length of the inner layers. The following describes an example of a current distribution of an outer layer as a physical quantity that is dependent on the wire length of inner layers.

Figure 8:
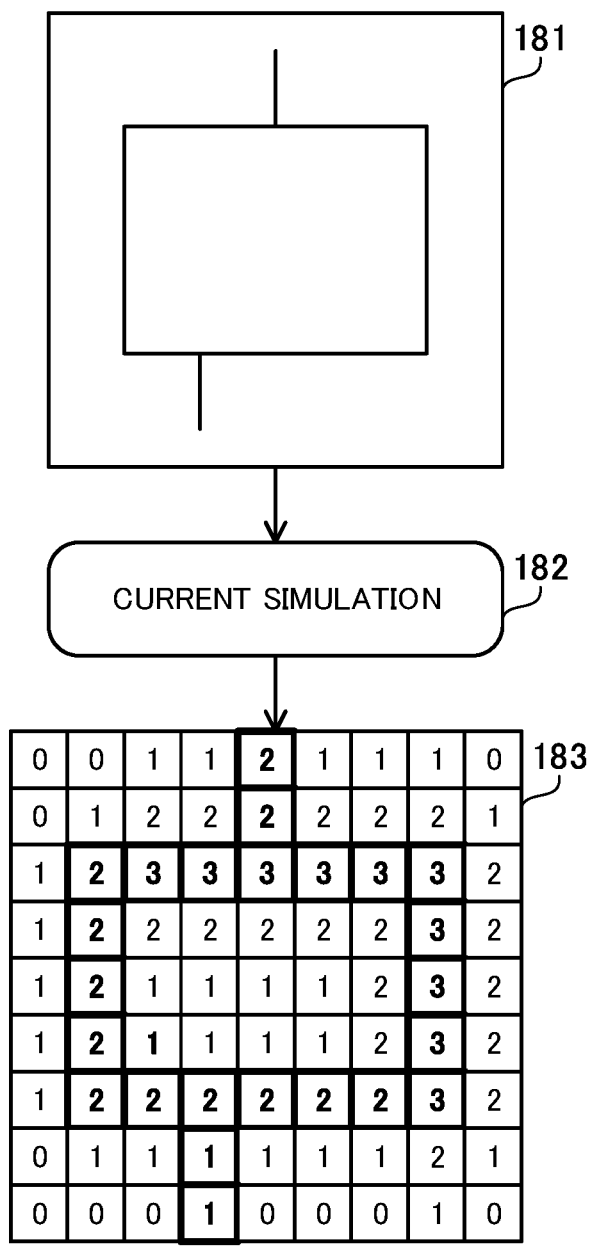
FIG. 8 illustrate an example of current distribution data.

FIG. 8 illustrates an example of current distribution data. The information processing apparatus 100 carries out a current simulation 182 to calculate the current distributions of outer layers. The current simulation 182 calculates a current that flows in a wire, on the basis of information on the logical structure of an electronic circuit. For the current simulation 182, for example, a library program such as simulation program with integrated circuit emphasis (SPICE) is used.

The information processing apparatus 100 generates circuit data 181 as an input to the current simulation 182. The circuit data 181 is two-dimensional representing the logical connection relationship among electronic components such as resistors (R), coils (L), and capacitors (C). The circuit data 181 does not need to include information on a physical structure such as the shapes and vertical hierarchy of wires. The current simulation calculates a current that flows in a wire on the basis of the circuit data 181. The two-dimensional current simulation 182 has sufficiently low computational complexity, as compared with the three-dimensional electromagnetic wave simulation 132.

The information processing apparatus 100 generates image data 183 on the basis of the calculation result of the current simulation 182. The image data 183 represents the current distribution of one outer layer. The image data 183 has the same size as the above-described image data 161 to 164. The information processing apparatus 100 sets, for elements corresponding to small areas through which a wire passes, numerical values indicating the magnitude of current at the respective positions of the elements. In addition, the information processing apparatus 100 sets numerical values for elements corresponding to small areas in the vicinity of the wire in such a manner that a smaller numerical value is set for an element as the element is more separate from the wire. As an example, the current value of each element through which the wire passes is three, the current value of each element apart by one from the wire is two, the current value of each element apart by two from the wire is one, and the current value of each element apart by three from the wire is zero.

The information processing apparatus 100 generates image data representing a current distribution with respect to each of the first, second, (N−1)th, and Nth layers that are outer layers. With respect to the first and Nth layers that are wiring layers, the information processing apparatus 100 generates the image data based on the magnitude of current flowing in wires as described above. As described earlier, a return current flows in the second layer that is a power supply layer and the (N−1)th layer that is a GND layer. Therefore, with respect to each of the second and (N−1)th layers, the information processing apparatus 100 determines the magnitude of the return current so as to be consistent with the magnitude of current of the adjacent wiring layer and generates the image data on the basis of the magnitude of the return current.

In the case of using the current distributions of the outer layers as information indicating the wire length of the inner layers, for example, the information processing apparatus 100 generates a tensor with a size of 100 (vertical)×100 (horizontal)×8 (channels) as an input to the model. In this connection, assuming that the current distribution of the first layer and the current distribution of the second layer are sufficiently approximate to each other, the information processing apparatus 100 may omit the image data of the current distribution of the second layer. Likewise, assuming that the current distribution of the (N−1)th layer and the current distribution of the Nth layer are sufficiently approximate to each other, the information processing apparatus 100 may omit the image data of the current distribution of the (N−1)th layer.

The following describes how to generate training data. The information processing apparatus 100 generates the circuit data of an electronic circuit with 6-layer structure in which the first, third, and sixth layers include wires. The information processing apparatus 100 generates different circuit data samples while changing the wire of the first layer, the wire of the sixth layer, and the wire length of the third layer. The information processing apparatus 100 generates electromagnetic wave data by carrying out an electromagnetic wave simulation 132 on each circuit data sample.

Figure 9:
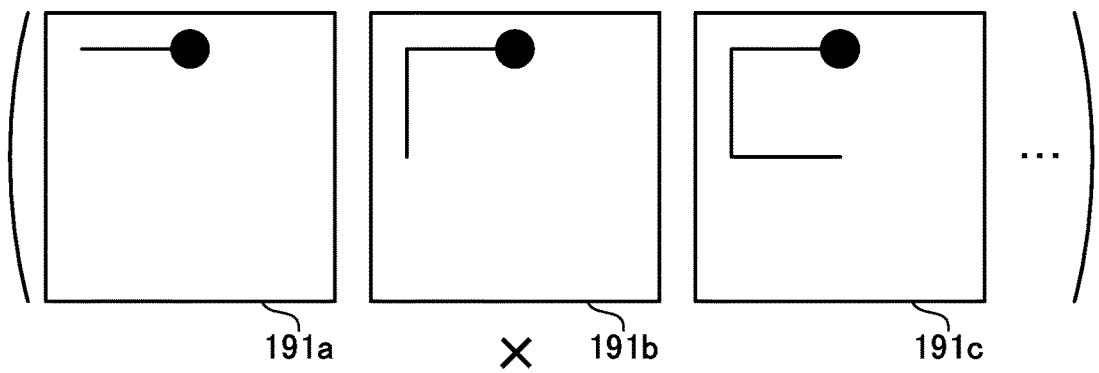
FIG. 9 illustrates an example of generating circuit data for use in machine learning.
Figure 9:
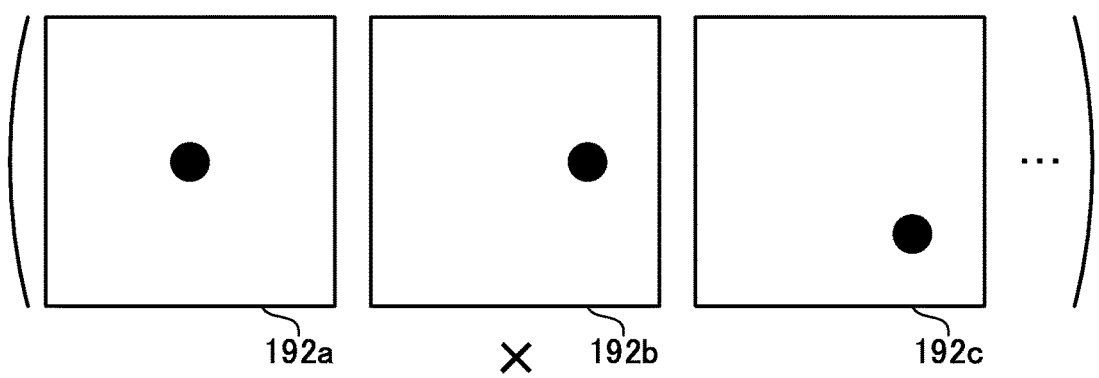
Figure 9:
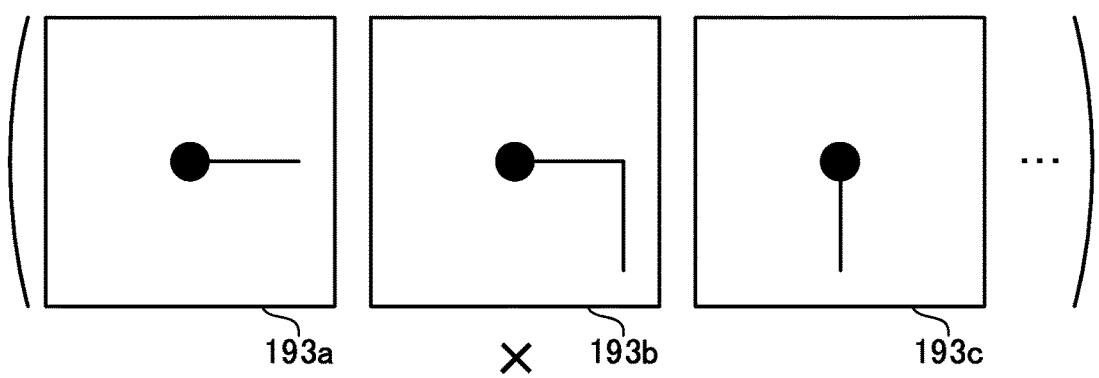
Figure 9:
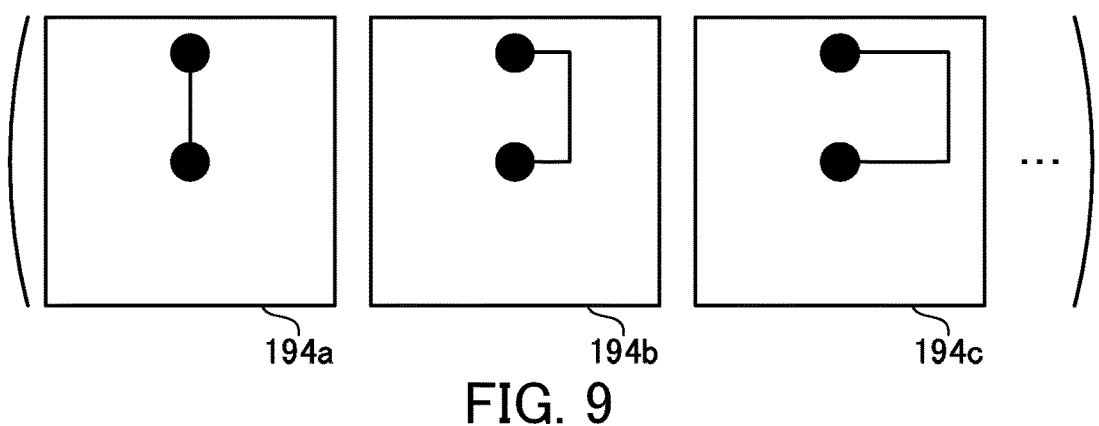

FIG. 9 illustrates an example of generating circuit data for use in machine learning. The information processing apparatus 100 prepares 50 wire shapes including wire shapes 191*a*, 191*b*, and 191*c* as candidates for the wire shape of the first layer. In addition, the information processing apparatus 100 prepares 10 start points including start points 192*a*, 192*b*, and 192*c* as candidates for the start point of the wire of the sixth layer. In addition, the information processing apparatus 100 prepares 50 wire shapes including wire shapes 193*a*, 193*b*, and 193*c* as candidates for the wire shape of the sixth layer. In addition, the information processing apparatus 100 prepares 5 wire lengths including wire lengths 194*a*, 194*b*, and 194*c* as candidates for the wire length of the third layer.

The information processing apparatus 100 selects one of the candidates for the wire shape of the first layer, one of the candidates for the start point of the sixth layer, one of the candidates for the wire shape of the sixth layer, and one of the candidates for the wire length of the third layer, and generates one circuit data sample. The information processing apparatus 100 comprehensively generates 125000 samples (=50×10×50×5). Thereby, the training data for the machine learning is generated.

In this connection, if not only wire length but also wire shape are used as information on the third layer, 50 candidates are prepared for the information on the third layer. In this case, 1250000 samples (=50×10×50×50) are generated. As a result, the data size of the training data is increased by 10 times. By limiting the information on inner layers to the wire length, as described above, the data size of the training data is reduced.

Figure 10:
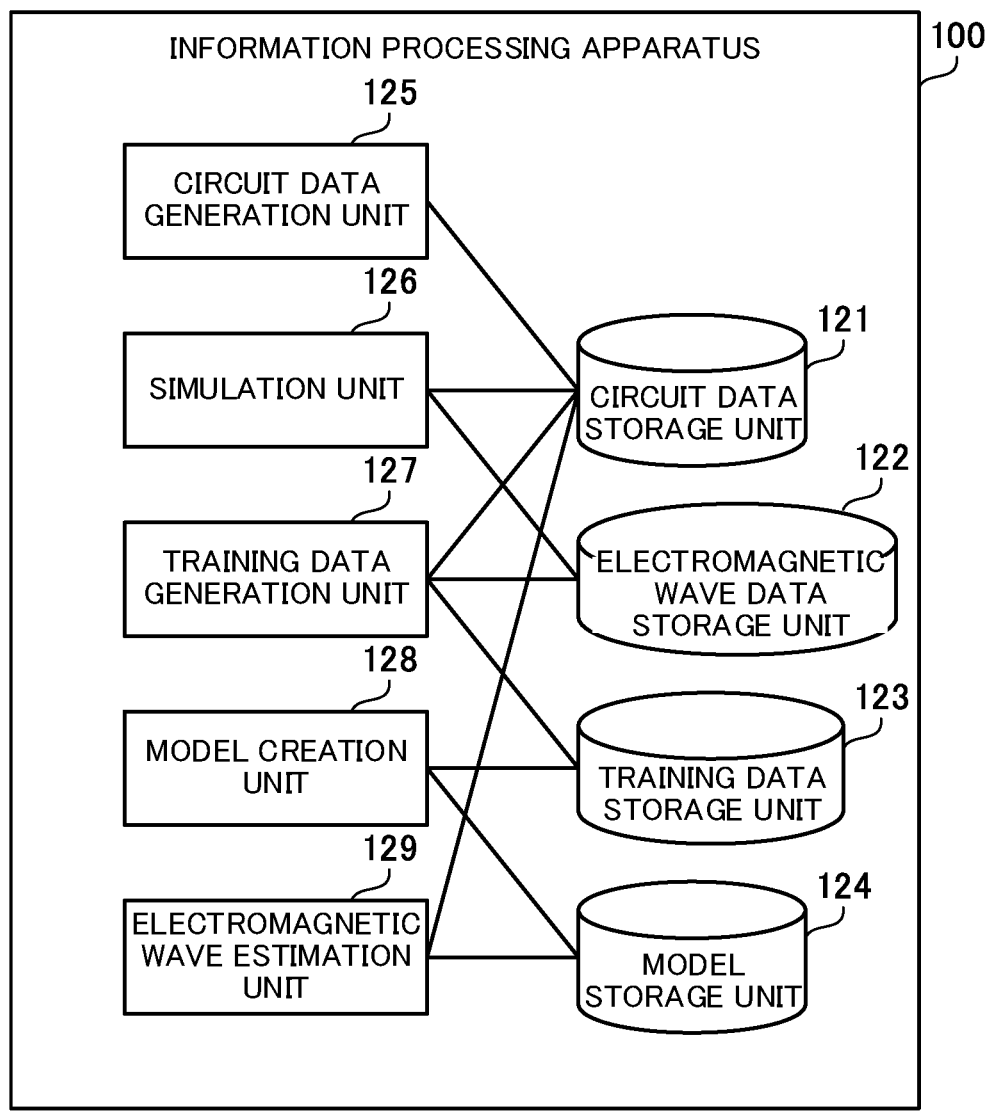
FIG. 10 is a block diagram illustrating an example of functions of the information processing apparatus according to the second embodiment.

The following describes the functions and processing procedure of the information processing apparatus 100. FIG. 10 is a block diagram illustrating an example of functions of the information processing apparatus according to the second embodiment. The information processing apparatus 100 includes a circuit data storage unit 121, an electromagnetic wave data storage unit 122, a training data storage unit 123, and a model storage unit 124. The above storage units are implemented by using a storage space of the RAM 102 or HDD 103, for example. In addition, the information processing apparatus 100 includes a circuit data generation unit 125, a simulation unit 126, a training data generation unit 127, a model creation unit 128, and an electromagnetic wave estimation unit 129. The above processing units are implemented by using a program, for example.

The circuit data storage unit 121 stores therein circuit data samples for use in machine learning. The circuit data storage unit 121 also stores therein circuit data of an electronic circuit under design. The electromagnetic wave data storage unit 122 stores electromagnetic wave data indicating the intensity of electromagnetic waves at a position apart from an electronic circuit by a predetermined distance, in association with each individual circuit data sample stored in the circuit data storage unit 121. This electromagnetic wave data corresponds to teaching data.

The training data storage unit 123 stores therein training data for use in the machine learning. The training data includes a plurality of records that each contain input data representing a circuit structure and teaching data indicating the intensity of electromagnetic waves in association with each other. The model storage unit 124 stores therein a model created with the machine learning using the training data. The model is a neural network.

The circuit data generation unit 125 generates the circuit data samples and stores the samples in the circuit data storage unit 121. The circuit data generation unit 125 generates circuit data with six or more layer structure in which the second layer is a power supply layer and the (N−1)th layer is a GND layer, under predetermined rules. The simulation unit 126 carries out an electromagnetic wave simulation on each circuit data sample stored in the circuit data storage unit 121. For example, the electromagnetic wave simulation is a three-dimensional finite element method simulation of calculating the intensity of electromagnetic waves in the vicinity of an electronic circuit. The simulation unit 126 generates the electromagnetic wave data indicating the intensity of electromagnetic waves at the position apart from the electronic circuit by the predetermined distance and stores the electromagnetic wave data in the electromagnetic wave data storage unit 122.

The training data generation unit 127 generates an input tensor representing the wires of outer layers and indicating the wire length of inner layers from each circuit data sample stored in the circuit data storage unit 121. In addition, the training data generation unit 127 generates an output tensor listing a plurality of values indicating the intensity of electromagnetic waves at a plurality of frequencies on the basis of the electromagnetic wave data stored in the electromagnetic wave data storage unit 122. The training data generation unit 127 generates the training data including the plurality of records each of which contains the input tensor and the output tensor in association with each other, and stores the training data in the training data storage unit 123.

The model creation unit 128 performs machine learning using the training data stored in the training data storage unit 123 to create the model and stores the created model the model storage unit 124. The model is a neural network and the machine learning is deep learning. In the machine learning, the weights included in the neural network are determined with the back propagation method.

The electromagnetic wave estimation unit 129 reads the circuit data of the electronic circuit under design from the circuit data storage unit 121. The electromagnetic wave estimation unit 129 generates an input tensor from the circuit data in the same way as with the training data generation unit 127. The electromagnetic wave estimation unit 129 inputs the input tensor into the model stored in the model storage unit 124 and obtains an output tensor indicating the intensity of electromagnetic waves. The electromagnetic wave estimation unit 129 outputs electromagnetic wave data indicating the estimated intensity of electromagnetic waves. The electromagnetic wave estimation unit 129 may display the estimated electromagnetic wave data on the display device 111. Further, the electromagnetic wave estimation unit 129 may store the estimated electromagnetic wave data in the electromagnetic wave data storage unit 122. Still further, the electromagnetic wave estimation unit 129 may send the estimated electromagnetic wave data to another information processing apparatus.

Figure 11:
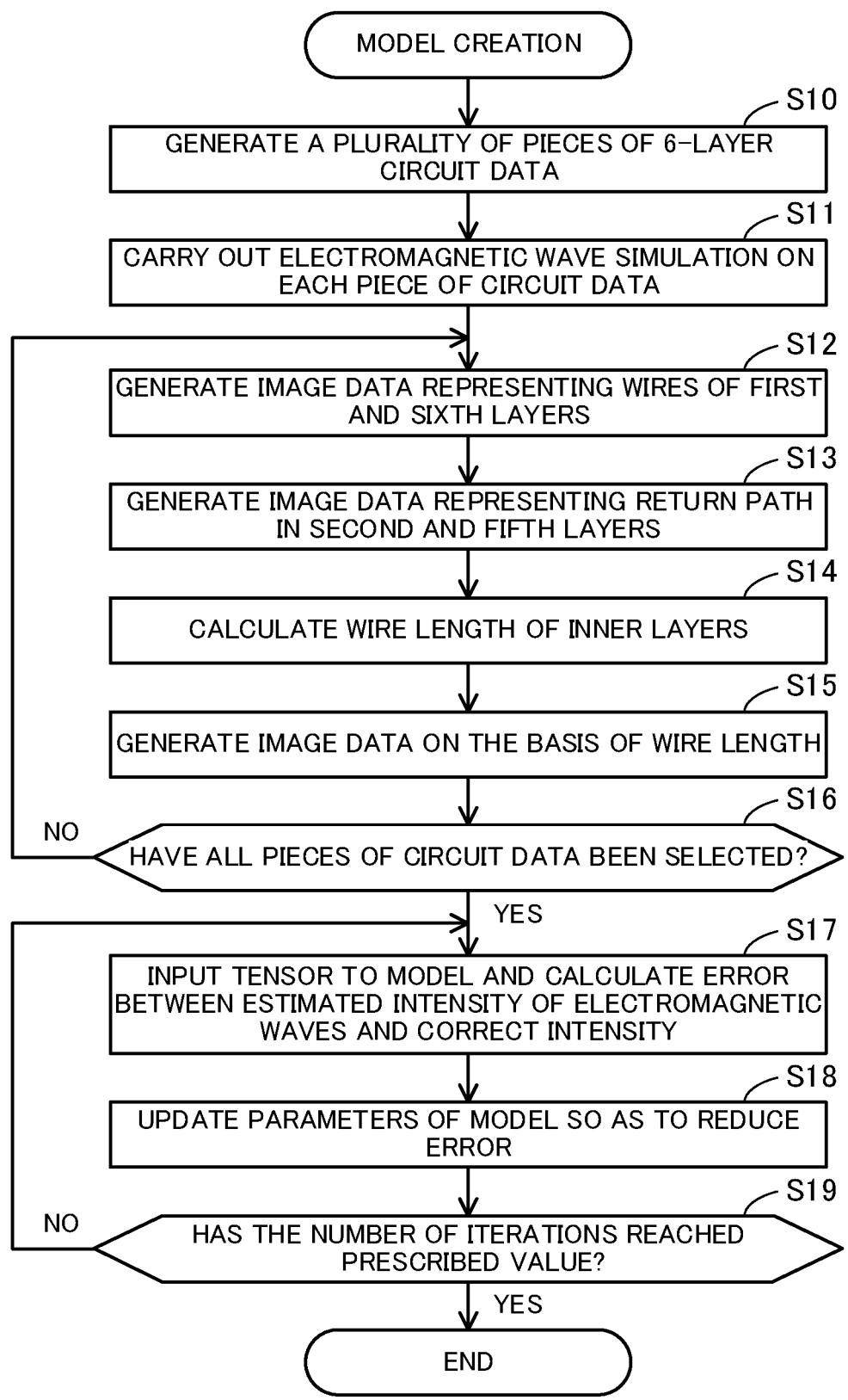
FIG. 11 is a flowchart illustrating an example of a procedure for model creation.

FIG. 11 is a flowchart illustrating an example of a procedure for model creation. The circuit data generation unit 125 generates a plurality of pieces of circuit data with 6-layer structure in which the first, third, and sixth layers include wires, the second layer is a power supply layer and fifth layer is a GND layer. The circuit data is generated by selecting the wire shape of the first layer, the start point of the wire of the sixth layer, the wire shape of the sixth layer, and the wire length of the third layer (S10). The simulation unit 126 carries out the electromagnetic wave simulation of the three dimensional finite element method on each piece of the circuit data generated at step S10. By doing so, with respect to each piece of the circuit data, the simulation unit 126 generates electromagnetic wave data indicating the intensity of electromagnetic waves at a position apart from an electronic circuit by a predetermined distance (S11).

The training data generation unit 127 selects one piece of the circuit data generated at step S10. The training data generation unit 127 generates image data is representing wires from each pattern of the first and sixth layers represented by the selected circuit data (S12). The training data generation unit 127 determines a return path from each pattern of the second and fifth layers represented by the selected circuit data and generates image data representing the return path (S13).

The training data generation unit 127 calculates a wire length based on the lengths of the wires included in the third layer that is an inner layer (S14). The training data generation unit 127 generates image data on the basis of the wire length of the inner layer. For example, the training data generation unit 127 generates image data in which all elements have the same numerical value indicating the wire length. In addition, for example, the training data generation unit 127 carries out a current simulation of calculating the current distributions of the first, second, fifth, and sixth layers to generate image data representing the current distributions calculated from the current simulation (S15).

The training data generation unit 127 generates a tensor including the image data of steps S12, S13, and S15. The training data generation unit 127 adds, to the training data the tensor including the image data and the electromagnetic wave data generated from the selected circuit data at step S11 in association with each other. The training data generation unit 127 determines whether all pieces of the circuit data have been selected at step S12. If all pieces of the circuit data have been selected, the process proceeds to step S17. If any piece of the circuit data has not been selected, the process returns back to step S12 (S16).

The model creation unit 128 extracts a tensor including image data and its associated electromagnetic wave data from the training data. The model creation unit 128 inputs the tensor including the image data into the model and obtains an estimated intensity of electromagnetic waves output from the model. The model creation unit 128 calculates an error between the correct intensity of electromagnetic waves indicated by the electromagnetic wave data extracted from the training data and the estimated intensity of electromagnetic waves (S17). The model creation unit 128 updates parameters of the model such as to reduce the error (S18).

The model creation unit 128 determines whether the number of iterations of steps S17 and S18 has reached a predetermined value. If the number of iterations has reached the predetermined value, the model creation unit 128 stores the model and completes the machine learning. If the number of iterations has not reached the predetermined value, the process proceeds back to step S17 (S19). In this connection, a completion condition other than the number of iterations may be set. For example, a completion condition that an error falls below a threshold may be set.

Figure 12:
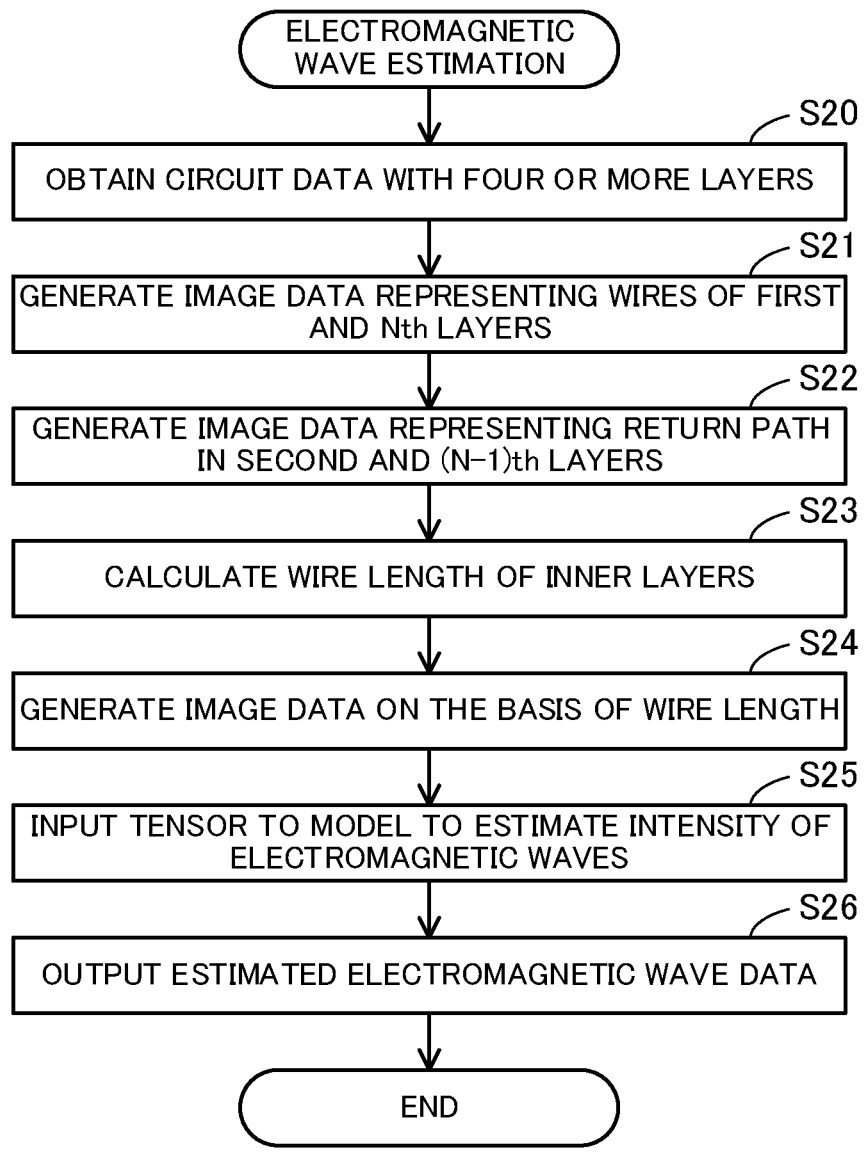
FIG. 12 is a flowchart illustrating an example of a procedure for electromagnetic wave estimation.

FIG. 12 is a flowchart illustrating an example of a procedure for electromagnetic wave estimation. The electromagnetic wave estimation unit 129 obtains circuit data that is the circuit data of an electronic circuit under design with N layers (N is an integer of four or greater) (S20). The electromagnetic wave estimation unit 129 generates image data representing wires from each pattern of the first and Nth layers represented by the obtained circuit data (S21). The electromagnetic wave estimation unit 129 determines a return path from each pattern of the second and (N−1)th layers represented by the obtained circuit data and generates image data representing the return path (S22).

The electromagnetic wave estimation unit 129 calculates a wire length based on the lengths of the wires included in the third to (N−2)th layers that are inner layers. In this connection, in the case where there is no inner layer, like the case of N=4, the wire length is 0 (S23). The electromagnetic wave estimation unit 129 generates image data on the basis of the wire length of the inner layers. For example, the electromagnetic wave estimation unit 129 generates image data in which all elements have the same numerical value indicating the wire length. In addition, for example, the electromagnetic wave estimation unit 129 carries out a current simulation to calculate the current distributions of the first, second, fifth, and sixth layers, and generates image data representing the current distributions calculated from the current simulation (S24).

The electromagnetic wave estimation unit 129 generates a tensor including the image data of steps S21, S22, and S24. The electromagnetic wave estimation unit 129 inputs the tensor into the model to estimate the intensity of electromagnetic waves (S25). The electromagnetic wave estimation unit 129 outputs electromagnetic wave data representing the estimated intensity of electromagnetic waves. For example, the electromagnetic wave estimation unit 129 displays the electromagnetic wave data on the display device 111 (S26).

As described above, the information processing apparatus 100 of the second embodiment creates, using machine learning, a model for estimating the intensity of electromagnetic waves on the basis of image data representing the patterns of electronic circuits. Then, the information processing apparatus 100 estimates the intensity of electromagnetic waves of an electronic circuit under design using the created model. Therefore, the designer of the electronic circuit does not need to implement the electronic circuit under design or measure the intensity of electromagnetic waves. In addition, the information processing apparatus 100 does not need to carry out an electromagnetic wave simulation with high computational complexity on the electronic circuit under design. Therefore, the designer is able to obtain information on the intensity of electromagnetic waves for various designs of electronic circuits promptly.

In addition, an input to the model includes image data representing the patterns of outer layers but does not include image data representing the patterns themselves of inner layers. Therefore, the information processing apparatus 100 does not need to generate many circuit data samples with different wire shaves of the inner layers in the machine learning, which reduces the load of generating training data. In addition, the data size of the training data is reduced, and the computational complexity of the machine learning is reduced. In addition, the size of an input to the model is fixed, irrespective of the number of inner layers. Therefore, the information processing apparatus 100 is able to use the same model for estimating the electromagnetic radiation from various electronic circuits with different numbers of layers. In addition, because of the shielding effect of the outer layers, the wire shapes of the inner layers do not have significant influence on the intensity of electromagnetic waves at a distant position. On the other hand, the training data includes information indicating the wire length of the inner layers since the wire length indirectly influence the intensity of electromagnetic waves at a distant position. Therefore, the accuracy of the model is secured.

According to one aspect, the data size of training data for use in machine learning is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, should be understood that various changes, substitutions, and alterations could be made hereto without departing from the spirit and scope of the invention.

What is claimed is:

1. A non-transitory computer-readable storage medium storing a machine learning program executable by one or more computers, the machine learning program comprising:
   an instruction for calculating a length of one or more wires included in one or more inner layers by selecting the one or more inner layers other than outermost layers and layers adjacent to the outermost layers from among a plurality of layers included in circuit data;
   an instruction for generating training data including first layer data corresponding to patterns of the outermost layers, second layer data corresponding to patterns of the layers adjacent to the outermost layers, and the length; and
   an instruction for training a machine learning model by using the training data, the machine learning model being for estimating electromagnetic waves radiated from an electronic circuit.

2. The non-transitory computer-readable storage medium according to claim 1, wherein the training data includes a tensor including first and second channels corresponding to the outermost layers, third and fourth channels corresponding to the layers adjacent to the outermost layers, and a fifth channel indicating the length.

3. The non-transitory computer-readable storage medium according to claim 1, wherein a size of an input to the machine learning model is fixed without respect to a number of layers included in the one or more inner layers.

4. The non-transitory computer-readable storage medium according to claim 1, wherein
   the outermost layers include a wire, and
   each of the layers adjacent to the outermost layers is either a power supply layer or a ground layer.

5. A computer-implemented machine learning method comprising:
   calculating a length of one or more wires included in one or more inner layers by selecting the one or more inner layers other than outermost layers and layers adjacent to the outermost layers from among a plurality of layers included in circuit data;
   generating training data including first layer data corresponding to patterns of the outermost layers, second layer data corresponding to patterns of the layers adjacent to the outermost layers, and the length; and
   training a machine learning model by using the training data, the machine learning model being for estimating electromagnetic waves radiated from an electronic circuit.

6. The computer-implemented machine learning method according to claim 5, wherein the training data includes a tensor including first and second channels corresponding to the outermost layers, third and fourth channels corresponding to the layers adjacent to the outermost layers, and a fifth channel indicating the length.

7. The computer-implemented machine learning method according to claim 5, wherein a size of an input to the machine learning model is fixed without respect to a number of layers included in the one or more inner layers.

8. The computer-implemented machine learning method according to claim 5, wherein
   the outermost layers include a wire, and
   each of the layers adjacent to the outermost layers is either a power supply layer or a ground layer.

9. A computing system comprising:
   a memory that stores therein circuit data including a plurality of layers; and
   a processor coupled to the memory, the processor being configured to
      calculate a length of one or more wires included in one or more inner layers by selecting the one or more inner layers other than outermost layers and layers adjacent to the outermost layers from among the plurality of layers,
      generate training data including first layer data corresponding to patterns of the outermost layers, second layer data corresponding to patterns of the layers adjacent to the outermost layers, and the length, and train a machine learning model by using the training data, the machine learning model being for estimating electromagnetic waves radiated from an electronic circuit.

\* \* \* \* \*